May 5, 1925.

G. SWANSON

FISHING TACKLE BOX

Filed Feb. 9, 1924

1,536,315

INVENTOR:
GUST SWANSON.

BY Whiteley and Ruckman

ATTORNEYS.

Patented May 5, 1925.

1,536,315

UNITED STATES PATENT OFFICE.

GUST SWANSON, OF MINNEAPOLIS, MINNESOTA.

FISHING-TACKLE BOX.

Application filed February 9, 1924. Serial No. 691,661.

*To all whom it may concern:*

Be it known that I, GUST SWANSON, a citizen of the United States, residing at Minneapolis, in the county of Hennepin and State of Minnesota, have invented certain new and useful Improvements in Fishing-Tackle Boxes, of which the following is a specification.

My invention relates to fishing tackle boxes, and an object is to provide a device of this character which even when filled with fishing tackle will have a specific gravity less than that of water so that it will not sink and become lost in case it gets into the water while being used by fishermen. Another object is to provide a box of this character which is watertight so that water cannot get into the box when closed.

The full objects and advantages of my invention will appear in connection with the detailed description, and the novel features of my inventive idea will be particularly pointed out in the claim.

Figure 1:
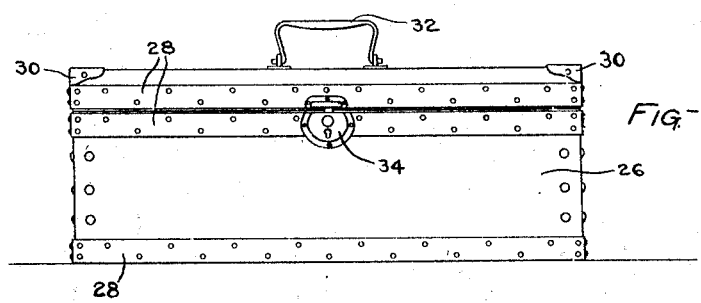
Figure 2:
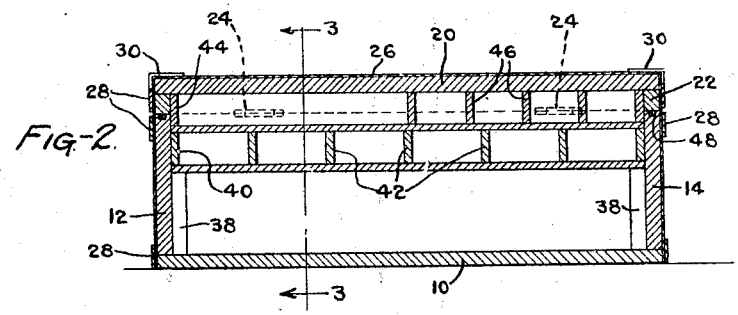
Figure 3:
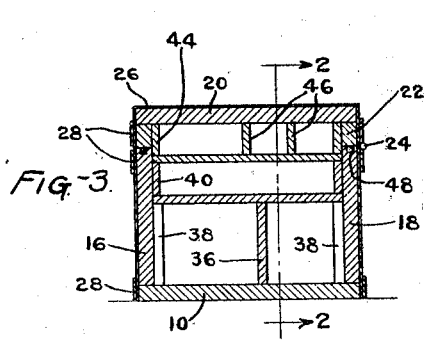
Figure 4:
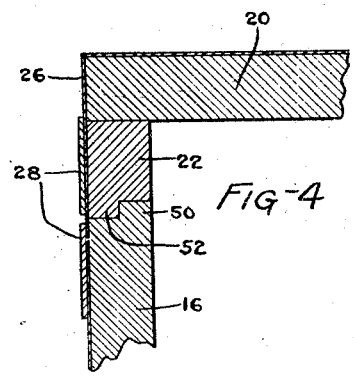
Figure 5:
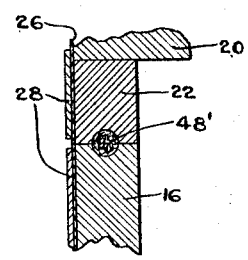

In the accompanying drawings which illustrate my invention, Fig. 1 is a front elevational view of the fishing tackle box. Fig. 2 is a view in longitudinal section on the line 2—2 of Fig. 3. Fig. 3 is a view in transverse section on the line 3—3 of Fig. 2. Fig. 4 is a fragmentary sectional view on an enlarged scale showing a slightly different watertight joint. Fig. 5 is a view similar to Fig. 4 and showing a still different form of water-tight joint.

As shown in the drawings, I provide a box constructed of material such as wood having a lower specific gravity than that of water. The box has a bottom 10, two side wall members 12 and 14, a front wall member 16 and a rear wall member 18. A closure is provided which consists of a top member 20 to which is secured a depending marginal flange 22. The rear portion of this flange is secured by hinges 24 to the rear wall member 18. The box is coated with water-proof material such as varnish or shellac and is then covered with a layer of water-resisting sheet material 26 such as artificial leather which is secured in place by brass strips 28 passing horizontally around the box. The upper corners are re-inforced by angular pieces 30. A handle 32 is secured to the top of the box and the front of the box is provided with a lock 34. The lower portion of the box is divided into two compartments by a partition 36 extending up part way from the bottom. Secured to the inner surface of the box are vertical pieces 38 which extend up from the bottom to the same height as the partition 36. A tray 40 is supported on the partition 36 and the pieces 38. This tray is separated into a number of compartments by the partitions 42. A tray 44 is supported upon the tray 40, the tray 44 being separated into a number of compartments by partitions 46. The surrounding flange 22 of the closure fits down over the tray 44. The trays and the inside of the box are preferably coated with varnish or shellac. The upper surface of the bottom of the box is provided with a surrounding groove for receiving packing material 48 such as rubber in order to make a water-tight joint when the cover is closed. In the modification shown in Fig. 4, instead of employing packing material, a water-tight joint between the closure and the body of the box is produced by providing the upper surface of the box with a surrounding flange 50 which extends from the inner surface part way to the outer surface. Over this flange fits a surrounding flange 52 formed on the lower surface of the flange 22 and extending from the outer surface part way to the inner surface. In the modification shown in Fig. 5, the lower surface of the flange 22 and the upper surface of the body of the box are each provided with grooves which are semi-circular in cross-section. A strip of packing material 48' such as rubber is secured in one of these grooves and will fit into the other groove when the cover is closed.

I claim:

A fishing tackle box having a specific gravity less than that of water, a plurality of fishing tackle compartments therein, a closure for the box consisting of a flat top member provided with a marginal flange which makes a water-tight joint with the body of the box when closed, a coating of varnish on the outside of the box, a layer of artificial leather outside of said varnish, metal strips passing horizontally around the box for holding said artificial leather in place, and reinforcing angular pieces secured to the corners of said closure.

In testimony whereof I hereunto affix my signature.

GUST SWANSON.